(12) United States Patent
Mikan et al.

(10) Patent No.: US 8,068,825 B2
(45) Date of Patent: Nov. 29, 2011

(54) SECOND PARTY CONTROL OVER MOBILE DEVICE USAGE

(75) Inventors: Jeffrey Clinton Mikan, Cumming, GA (US); John Ervin Lewis, Lawrenceville, GA (US); Justin McNamara, Atlanta, GA (US); Fulvio Cenciarelli, Suwanee, GA (US); Anastasios L. Kefalas, Alpharetta, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 822 days.

(21) Appl. No.: 11/610,329

(22) Filed: Dec. 13, 2006

(65) Prior Publication Data
US 2008/0146211 A1    Jun. 19, 2008

(51) Int. Cl.
| | |
|---|---|
| *H04M 3/00* | (2006.01) |
| *H04B 1/06* | (2006.01) |
| *H04B 1/38* | (2006.01) |
| *H04M 1/66* | (2006.01) |
| *H04M 1/68* | (2006.01) |
| *H04M 3/16* | (2006.01) |
| *H04M 1/00* | (2006.01) |
| *H04W 4/00* | (2009.01) |

(52) U.S. Cl. ....... 455/419; 455/420; 455/26.1; 455/410; 455/411; 455/466; 455/567; 379/188

(58) Field of Classification Search .................. 455/419, 455/420, 567, 26.1, 410, 411, 466; 379/188
See application file for complete search history.

(56) References Cited

U.S. PATENT DOCUMENTS

| | | | | |
|---|---|---|---|---|
| 6,665,376 | B1* | 12/2003 | Brown | 379/85 |
| 7,302,272 | B2* | 11/2007 | Ackley | 455/466 |
| 2004/0132480 | A1* | 7/2004 | Parker et al. | 455/550.1 |
| 2007/0124760 | A1* | 5/2007 | Novak et al. | 725/25 |
| 2008/0005325 | A1* | 1/2008 | Wynn et al. | 709/225 |
| 2008/0162652 | A1* | 7/2008 | True et al. | 709/206 |
| 2009/0097627 | A9* | 4/2009 | Liljestrand et al. | 379/201.03 |

FOREIGN PATENT DOCUMENTS

| | | |
|---|---|---|
| EP | 1701526 | 9/2006 |
| WO | 2006/002048 | 1/2006 |

* cited by examiner

*Primary Examiner* — Nick Corsaro
*Assistant Examiner* — Munsoon Choo
(74) *Attorney, Agent, or Firm* — Woodcock Washburn LLP

(57) ABSTRACT

A mechanism is provided whereby a parent, or other second party, can monitor and/or control a child's or other first party's wireless device usage. An interface can allow the parent to set rules for the child's usage, and can specify that the parent should receive messages when a call is made to or from the child's wireless device. In addition to call information, the message may prompt the parent for approval of the call connection. Thus, a parent can decide whether a call that is incoming from or outgoing to a third party should be permitted.

41 Claims, 5 Drawing Sheets

SECOND PARTY CONTROL OVER MOBILE DEVICE USAGE

BACKGROUND

One reason parents may not allow a child to have a mobile device, such as a cellular telephone, is that the parent has little control over the child's usage of the device. For example, the parent cannot prevent a child from placing or receiving calls while at school, and cannot prevent the child from calling or being called by a particular party. In addition, a parent has no ability to know when a child is using the device or the types of conversations the child is having. As a result, some parents do not allow their children to have a mobile device, or resign themselves to not being able to control their child's use of the device.

There is a need in the industry to provide a practical solution that allows providing a mobile device to a first party by a second party while retaining some control by the second party over the first party's device usage.

SUMMARY

Such issues can be addressed by providing a mechanism that enables a parent, or other second party, to monitor and even control, in real time, a child's or other first party's mobile device usage. An interface can allow the parent to set rules for the child's usage, and can specify that the parent should receive messages when a communication is made involving the child's mobile device. In addition to providing information describing a communication, the message may prompt the parent for approval of the communication connection. Thus, a parent can decide whether a communication that is incoming from or outgoing to a third party should be permitted. Other advantages and features of the invention are described below.

BRIEF DESCRIPTION OF THE DRAWINGS

The systems, methods, and computer readable media associated with second party control over wireless device usage are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
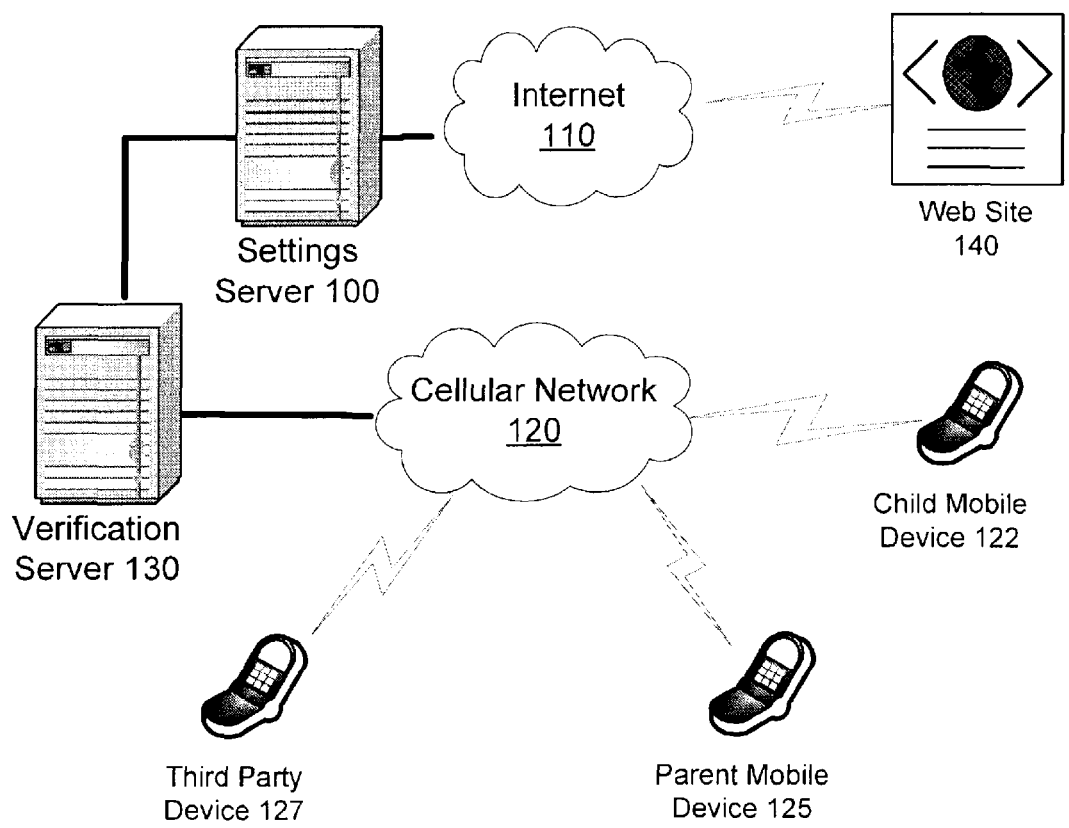
FIG. 1 illustrates a network 120 as may transmit communications between a first party mobile device 122 and a third party device 127. Such communications may be prohibited, screened, copied, and/or permitted by a verification server 130 according to rules established via a web site 140 that is supported by settings server 100. If a communication is screened, an approval request may be sent to a second party mobile device 125 prior to allowing or terminating the communication between 122 and 127.

FIG. 1 illustrates a network 120 as may transmit communications between a first party mobile device 122 and a third party device 127. Such communications may be prohibited, screened, copied, or permitted by a verification server 130 according to rules established via a web site 140 that is supported by settings server 100. If a communication is screened, an approval request may be sent to a second party mobile device 125 prior to allowing or terminating the communication between 122 and 127.

Mobile devices 122 and 125 may be any of a wide variety of such devices, such as cell phones, Personal Digital Assistant (PDA) type devices, and the like. In one embodiment, mobile devices 122 and 125 are both supported by a same network provider and associated with a same customer account. First party mobile device 122 may be, for example a child's mobile device under a same billing plan as a parent's mobile device 125.

The child and parent are referred to herein as "first party" and "second party," respectively, to emphasize that a parent/child relationship is not required by the invention. The parent/child relationship is one situation in which a second party is responsible for managing a customer relationship with a network provider, and wherein the customer relationship encompasses a plurality of mobile devices. This arrangement provides a convenient setting in which to implement the invention, because a customer managing an account presumably has authority to control communications involving mobile devices serviced under his account, and because the network provider knows of, and can control communications to, all of the various mobile devices under the customer account.

The second party can be given access to website 140 while others in possession of mobile devices under the same account may not necessarily know about or have access to the website 140. The second party is presumably entitled to control communications by the various devices in his account, and is likewise entitled to information regarding communications made by such devices. In fact, situations may arise in which a single party has multiple devices for personal use and wishes to manage communications to one or more such devices. In situations involving multiple parties, however, some care may be required to comply with relevant law protecting the privacy of the various parties.

Third party device 127 may be any device capable of sending communications to first device 122 via network 120. For example, third party device 127 may be a landline telephone operated by a friend of the child associated with first party device 122. In this situation, third party device 127 may initially send communications across a circuit-switched network. Such communications are subsequently delivered to cellular network 120, which manages delivery of the communication to first party device 122. Third party device 127 may also be a cell phone associated with a network provider that operates network 120, or a cell phone associated with another network provider as will be appreciated.

The verification server 130 may comprise a wide variety of electronic components as may be used in various embodiments of the invention. Verification server 130 may be coupled to network 120 in a wide variety of possible configurations. Verification server 130 may use any second party rules for determining whether a communication should be prohibited, screened, copied, or permitted. For example, a rule may state that a call initiated from an identified third party is prohibited. Verification server 130 detects that a call from a third party device 127 is prohibited, and terminates the call prior to connecting it to first party device 127.

The settings server 100 may similarly comprise a wide variety of electronic components as will be appreciated, and may be coupled to the internet 110 as well as verification server 130 in a wide variety of possible configurations. The settings server 100 may act as an interface between the web site 140 accessible by the second party, and the verification server 130. Embodiments in which verification server 130 and settings server 100 are the same server are also possible. The settings server 100 provides an interface—illustrated above as a web site 140, but it may be a dial-in service, or other human interface—that enables the second party to set, modify and delete rules that may be used to determine whether a particular communication involving the first party device 122 will be prohibited, screened, copied, or permitted.

If a rule states that a particular communication is to be screened, then an approval request may be sent to the second party mobile device 125 when such communication is attempted. For example, if a text message is attempted from third party device 127 to first party device 122, and a rule established via website requires screening of such communications, then an approval request can be sent to second party device 125. The second party may allow or deny the communication by responding to the approval request.

For example, if the request is denied, a response may be sent back to verification server 130. The verification server 130 may then terminate the communication, e.g., by not sending the text message to first party device. If a rule states that a particular communication is to be permitted, then the communication can be allowed without requesting approval from the second party device 125.

Figure 2:
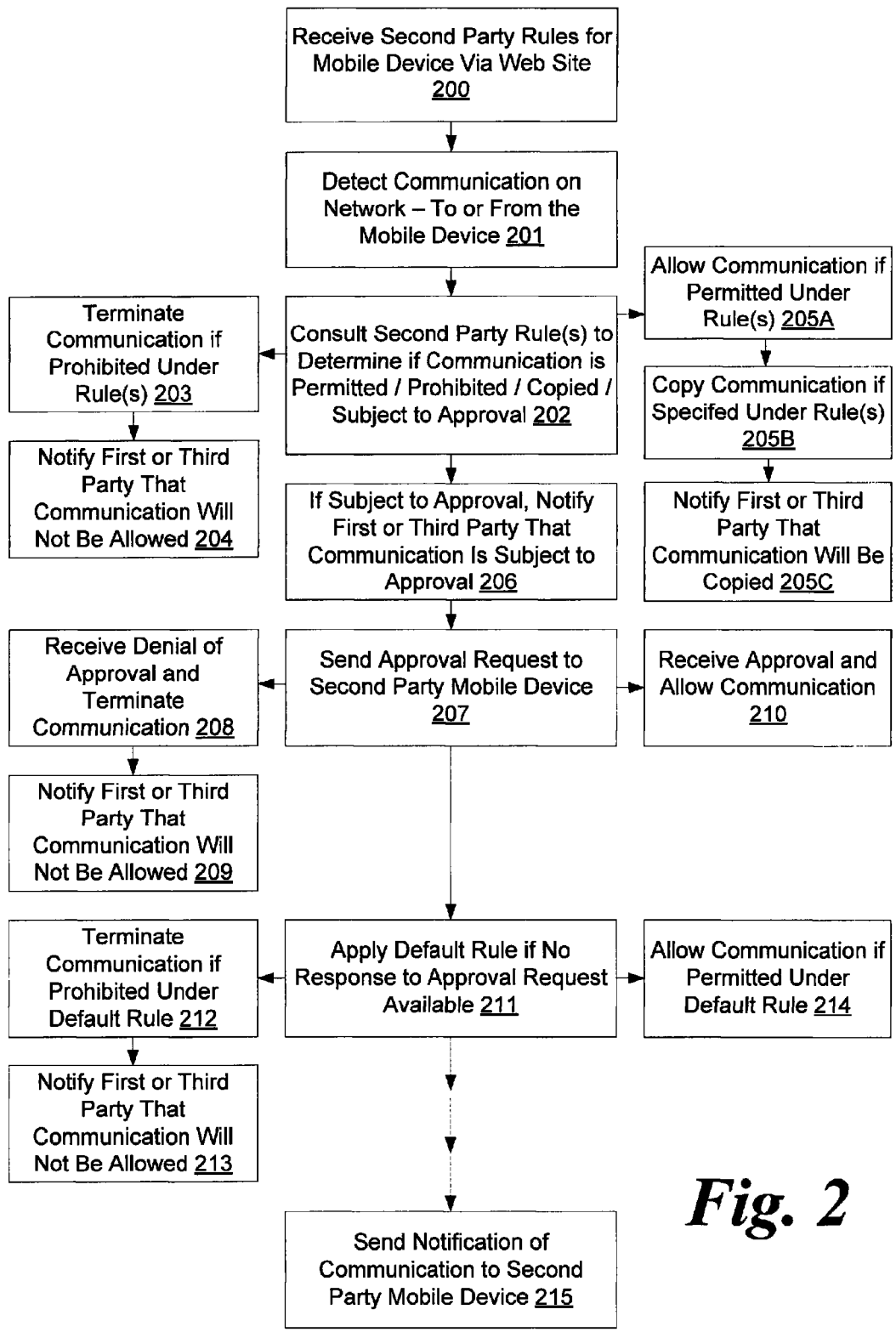
FIG. 2 illustrates methods for prohibiting, screening, copying, or permitting a communication in accordance with second party rules.

FIG. 2 illustrates a method comprising receiving second party rules for a device via a website 200, and subsequently applying such rules. First, a communication to or from a mobile device can be detected 201. The term "communication" is used herein to refer to any of a wide variety of communication types that may be used on today's mobile devices. Prevalent examples are telephone calls, emails, instant messages, and text messages.

In one embodiment, a communication may be detected 201 by maintaining, by a network provider, a list of devices that are subject to second party rules. All calls on the network can be checked against the list to determine whether they are subject to second party rules. In another embodiment, data may be stored on a device-by-device basis that identifies a particular device as subject to second-party rules. If a particular device is indicated as subject to rules, communications to such a device may be checked by a verifications server for rules compliance prior to allowing them.

Second party rules are consulted to determine if the communication is prohibited, screened, copied, or permitted 202. Embodiments may implement one or more of prohibiting, screening, copying, and permitting—it is not required that rules be extant that fall into each category. For example, only one rule that prohibits certain calls may be set. In another embodiment, the one rule prohibiting calls may be overridden, e.g., during certain times of day, by another rule permitting calls. In a still further embodiment, calls may be generally prohibited, but permitted during one part of the day and screened during another part of the day. It should be appreciated that rules for prohibiting, screening, copying, and permitting may be mixed and matched in a wide variety of configurations.

A communication may be terminated if it is prohibited under the second party rules 203. In this case, as in all cases where a communication is terminated, the party attempting the communication, i.e., either the first party or the third party, may be notified that the communication was terminated 204 as a courtesy. It may be beneficial to also provide additional information, such as suggestions regarding a time of day when such communications may be allowed.

Conversely, a communication may be immediately allowed 205A if the second party rules indicated that it is allowed. If the communication is allowed but subject to being copied, then a communication recording component may copy the communication 205B as it occurs. For example, in the case of a call, a voice recording may be made and stored, along with call information such as originating telephone number, time of day and so forth, for review by the second party. In the case of a text message, the text to be copied along with affiliated metadata. Those involved in the communication may be notified of the copying 205C so as to comply with relevant law and custom as necessary.

If second party rules indicate a communication is subject to being screened, then in one embodiment the initiator of the communication may be notified of the screening 206. For example, a message may play asking the initiator to please wait while approval is requested. Screening may take additional time and therefore notification is advantageous. Alternatively, the initiator may simply hear additional "rings" or hold music or the like while waiting for approval.

In a further embodiment, screening may be accomplished by terminating or delaying a communication, then notifying the initiator when approval is received. In the case of a call, the initiator may simply redial, or the approval can automatically cause both first party and third party devices to ring. In the case of a text message, the message may be delayed indefinitely pending approval, then sent when approval is received.

To screen a call, an approval request is send to a second party mobile device 207. The approval request may be an IM-type message, a text message, or a script that enables the parent to respond in at least a yes/no manner.

Any type of information may be sent to the second party mobile device to aid in the determination of whether the communication should be permitted. For example, caller identification (caller ID) information regarding the third party may be sent along with the approval request. Address book information (if present) from the first party wireless device for the third party can also be leveraged. For example, a child's cell phone may identify a name of a third party involved in the communication, which can be helpful for the parent to make an approval determination. The address book information may be retrieved from the child's wireless device as needed, or may be mirrored in a network location. In another embodiment, a voice or name recording may be forwarded to the second party mobile device.

If the second party approves a communication, an approval is sent to the verification server by the second party mobile device. When the approval is received at the verification server 210, the communication may be subsequently allowed.

If the second party denies a communication, a denial is sent to the verification server by the second party mobile device. When the denial is received at the verification server 208, the communication may be subsequently terminated, and the initiator of the communication—either the first party or the third party—may be notified 209.

A default rule may also be utilized in situations where immediate approval or denial is not available for a communication subject to approval. The default rule may specify, for example, that if an approval or a denial is not received within 15 seconds of sending the approval request, then the communication should be allowed 214.

Conversely, the default rule may specify that if an approval or a denial is not received within 15 seconds of sending the approval request, then the communication should be terminated. The communication is terminated 212 and the initiator is notified as necessary 213.

Finally, a notification step 215 is provided in FIG. 2 which may be performed independently of the various other steps in the exemplary method. In addition to receiving any approval requests for screened calls as specified in one or more second party rules, a second party may elect to receive notifications of communications made to the first party mobile device. This way the second party, e.g., a parent, knows when and with whom communications are made by the first party, without interfering by approving or denying communications. Alternatively, the second party may elect to periodically receive a summary notification that summarizes first party usage. A notification may conveniently be in the form of an IM type message or a text message.

Figure 3:
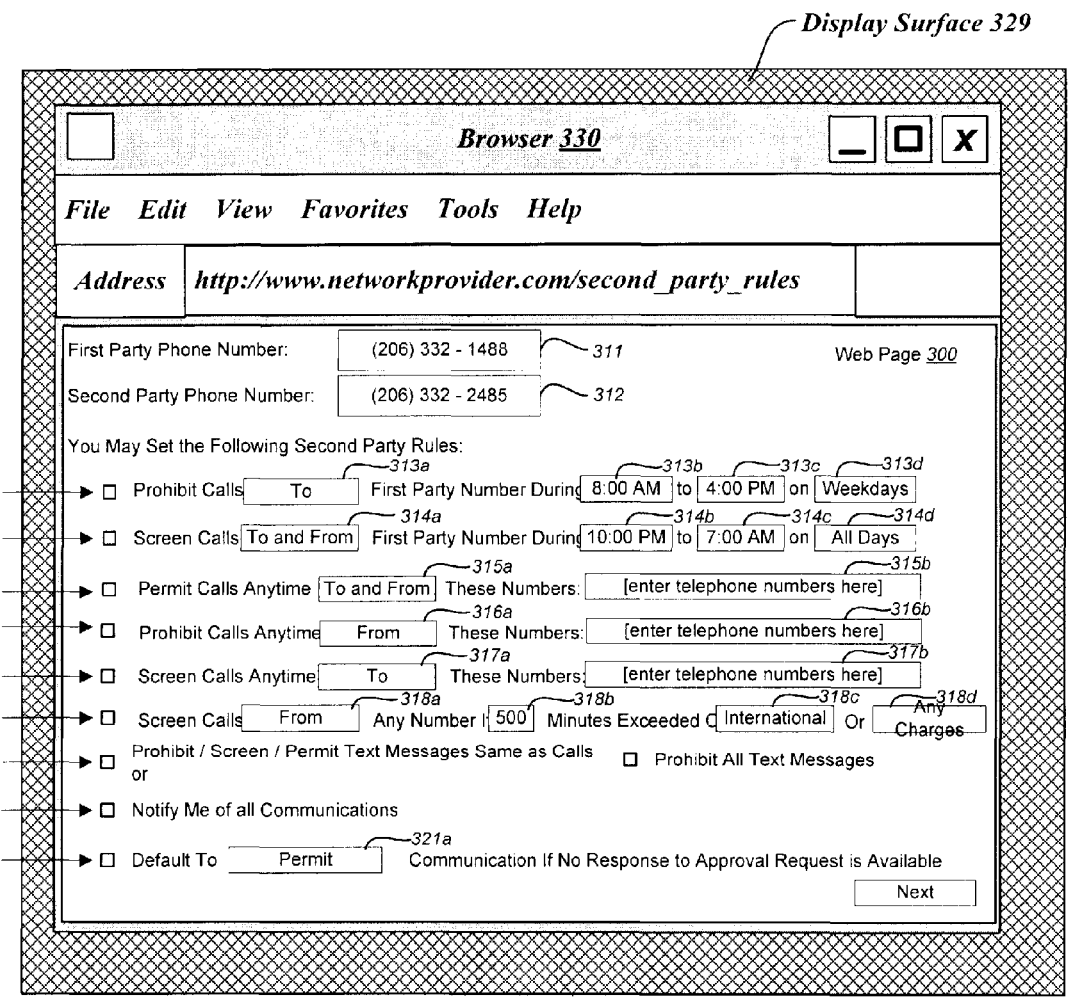
FIG. 3 illustrates an exemplary web site for establishing second party rules.
Figure 4:
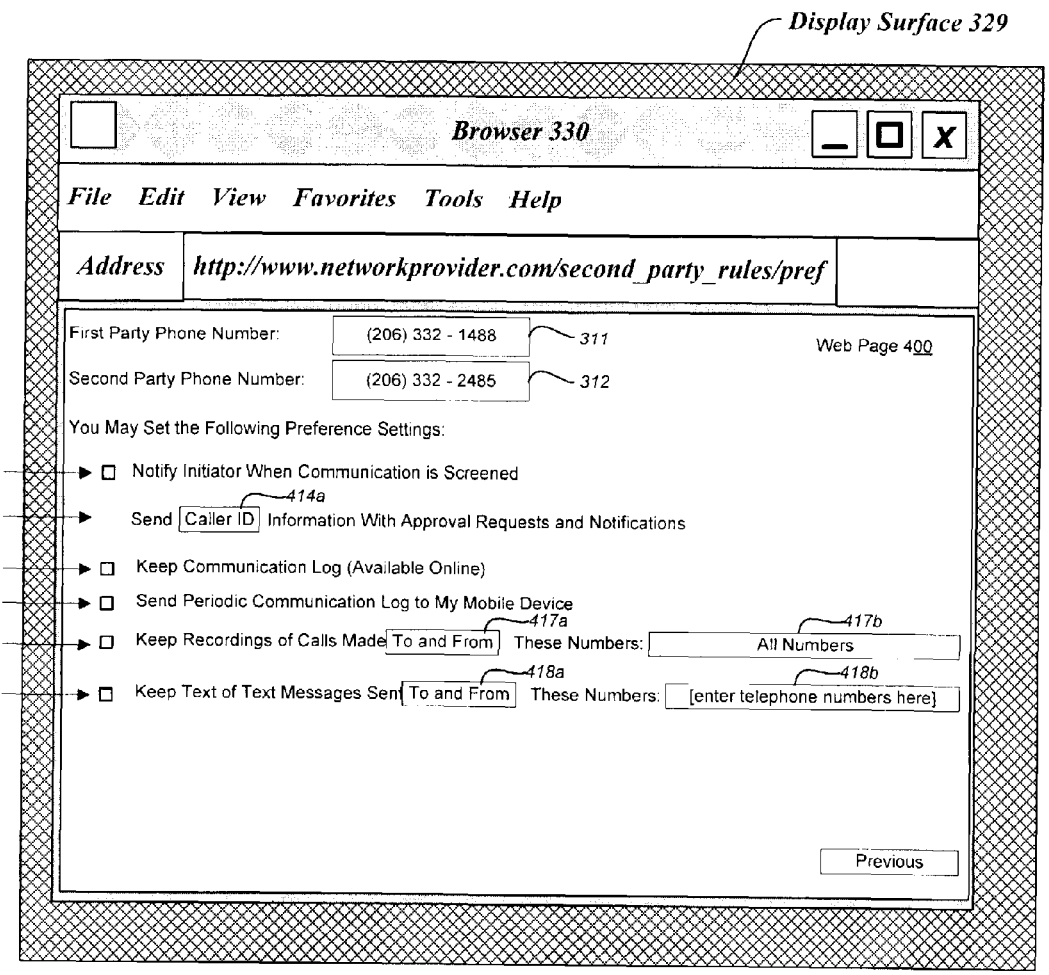
FIG. 4 illustrates an exemplary web site for establishing a variety of settings associated with second party rules.

FIGS. 3 and 4 illustrate a view of a browser 330 interface as may be displayed on a display surface 329 coupled to a client computer that is appropriately configured to communicate with a settings server. The browser 330 may point to one or more web pages, e.g. 300 and 400, which allow a second party to set second party rules and settings.

Referring to FIG. 3, a rules webpage 300 may identify a first party device by a telephone number 311, and may identify a second party device by a telephone number 312. A variety of rules 313-321 may be selected for use by the second party, if desired. Rules may be to the second party in a wide variety of ways, and the specific approach illustrated in FIG. 3 should be considered exemplary only.

A rule 313 may be supplied that allows the second party to prohibit communications involving the first party device during a specified time of day. A variety of selectable aspects 313a-313d may be provided to allow custom tailoring of the rule 313. A first customizable aspect 313a may allow the second party to select whether communications will be prohibited from the first party device, to the first party device, or to and from the first party device. By clicking on 313a the second party is presented with a list comprising "to," "from," and "to and from."

Further customizable aspects may comprise a component 313b to select or enter a start time, a box 313c to select or enter an end time, and a component 313d to select or enter days of the week to which the rule applies, for example, "Monday," "All Days," "Weekdays," or "Weekends."

Another rule 314 may be supplied that allows the second party to screen communications involving the first party device during a specified time of day. A variety of selectable aspects 314a-314d may be provided to allow custom tailoring of the rule 314, with similar options as described above.

Another rule 315 may be supplied that allows the second party to permit calls anytime if they involve a pre-approved third party telephone number. A component 315a may indicate the involvement properties of the pre-approved number(s). Another component 315b may allow the second party to enter one or more pre-approved telephone numbers.

Another rule 316 may be supplied that allows the second party to prohibit calls anytime if they involve a banned third party telephone number. A component 316a may indicate the involvement properties of the banned number(s). Another component 316b may allow the second party to enter one or more banned telephone numbers.

Another rule 317 may be supplied that allows the second party to screen calls anytime if they involve a screened third party telephone number. A component 317a may indicate the involvement properties of the screened number(s). Another component 317b may allow the second party to enter one or more banned telephone numbers.

Another rule 318 may be supplied that allows the second party to screen (and/or prohibit, if desired) calls if they will incur additional charges. A component 318a may indicate the involvement properties of the screened number(s). Components 318b, 318c, and 318d may indicate what types of charges should be screened. For example, any calls in excess of a predetermined usage time entered into component 318b may be subject to screening. International calls, long distance calls, out of network calls, daytime calls, extra toll calls, any call incurring charges, and the like may be screened via a components such as 318c and 318d.

Rules may be applied to particular communication types via rules such as 319. For example, text messages may be universally allowed, universally prohibited, universally screened and so forth. Text messages may be simply treated the same as calls. Any number of special rules that apply to only certain communication types may be advantageous.

A rule regarding notifications may be set, e.g. 321. Further notification rules may allow a second party to elect to receive a communications summary rather than real-time communication notifications.

A default rule 321 may allow the second party to prohibit or permit communications when no approval is available, for example if the second party device is turned off, not in communication with the network, or if a predetermined amount of time passes without receiving any response. The choice to prohibit or permit in this situation may be selected via a component such as 321a.

Referring to FIG. 4, a number of additional rules may be set by the second party via a webpage 400. The rules on webpage 400 may be categorized as settings or preferences. For example, a second party may elect whether to notify the initiator when a communication is screened 413. A second party may elect the type of information they prefer to receive in notifications and approval requests 414, for example by selecting "caller ID," "address book," "voice ID" or the like from a component 414 configured to present such options.

In one embodiment, a second party may elect to keep a communication log 415 that summarizes all communications involving the first party device. The communication log may be accessible via the web. The second party may also elect to receive a periodic communication log 416, and to record communications involving the first party device 417. Selective recording of particular communication types or communications involving particular third parties, or communications during certain specified times of day may also be implemented. An involvement property for communications to record can be set via component 417a, as can specific third party numbers 417b that the second party may desire to monitor. As illustrated, an "all numbers" option may also be made available.

A rule may require retaining text of text messages 418. Once again, an involvement property may be set via a component such as 418a and an targeted third party numbers may be entered via 418b.

Some calls may be permitted at all times, regardless of the second party preference. For example, even if a parent desires to screen all calls, a child's mobile device could permit a direct, unscreened connection for a 911 call.

Embodiments of rules selections such as 313-321 and 413-418 may allow separate sets of rules for incoming as opposed to outgoing calls, or the rules for both types of calls may be the same.

Figure 5:
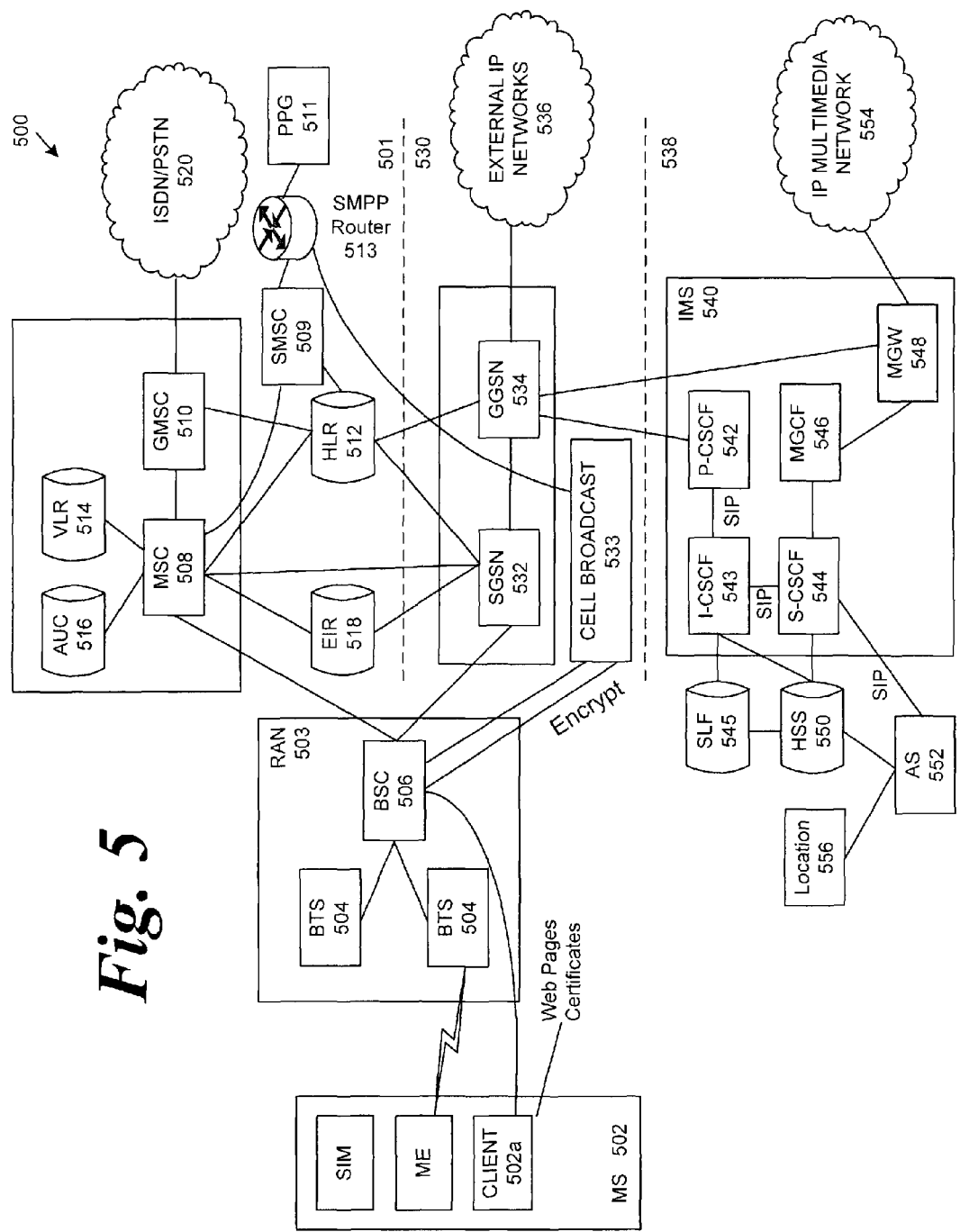
FIG. 5 illustrates a general operating environment for a mobile device.

FIG. 5 is directed to the general operating environment of a mobile device as provided herein. Terms such as "cellular communications" should be generally understood by those of skill in the art, and should be distinguished from other forms of wireless communications such as those based on the 802.11 protocols. FIG. 5 generally illustrates a cellular communications operating environment. The invention and the term cellular communications are not limited to any specific aspects of FIG. 5, but should rather be understood to operate in and refer to (respectively) operating environments such as the general type of operating environment illustrated in FIG. 5.

The global system for mobile communication ("GSM") is one of the most widely utilized cellular communications systems in today's fast growing telecommunication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High-Speed Downlink Packet Access ("HSDPA"), High-Speed Uplink Packet Access ("HSUPA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

FIG. 5 shows another exemplary block diagram view of a GSM/GPRS/IP multimedia network architecture 500 in which the apparatus and methods for service delivery based on priority level and/or revenue impact of the present invention may be incorporated. As illustrated, architecture 500 of FIG. 5 includes a GSM core network 501, a GPRS network 530 and an IP multimedia network 538. The GSM core network 501 includes a Mobile Station (MS) 502, at least one Base Transceiver Station (BTS) 504 and a Base Station Controller (BSC) 506. The MS 502 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 504 is physical equipment, such as a radio tower, that enables a radio interface to communicate with the MS. Each BTS may serve more than one MS. The BSC 506 manages radio resources, including the BTS. The BSC may be connected to several BTSs. The BSC and BTS components, in combination, are generally referred to as a base station (BSS) or radio access network (RAN) 503.

The GSM core network 501 also includes a Mobile Switching Center (MSC) 508, a Gateway Mobile Switching Center (GMSC) 510, a Home Location Register (HLR) 512, Visitor Location Register (VLR) 514, an Authentication Center (AuC) 518, and an Equipment Identity Register (EIR) 516. The MSC 508 performs a switching function for the network. The MSC also performs other functions, such as registration, authentication, location updating, handovers, and call routing. The GMSC 510 provides a gateway between the GSM network and other networks, such as an Integrated Services Digital Network (ISDN) or Public Switched Telephone Networks (PSTNs) 520. In other words, the GMSC 510 provides interconnecting functionality with external networks.

The HLR 512 is a database that contains administrative information regarding each subscriber registered in a corresponding GSM network. The HLR 512 also contains the current location of each MS. The VLR 514 is a database that contains selected administrative information from the HLR 512. The VLR contains information necessary for call control and provision of subscribed services for each MS currently located in a geographical area controlled by the VLR. The HLR 512 and the VLR 514, together with the MSC 508, provide the call routing and roaming capabilities of GSM. The AuC 516 provides the parameters needed for authentication and encryption functions. Such parameters allow verification of a subscriber's identity. The EIR 518 stores security-sensitive information about the mobile equipment.

A Short Message Service Center (SMSC) 509 allows one-to-one Short Message Service (SMS) messages to be sent to/from the MS 502. A Push Proxy Gateway (PPG) 511 is used to "push" (i.e., send without a synchronous request) content to the MS 502. The PPG 511 acts as a proxy between wired and wireless networks to facilitate pushing of data to the MS 502. A Short Message Peer to Peer (SMPP) protocol router 513 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 502 sends a location update including its current location information to the MSC/VLR, via the BTS 504 and the BSC 506. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 530 is logically implemented on the GSM core network architecture by introducing two packet-switching network nodes, a serving GPRS support node (SGSN) 532, a cell broadcast and a Gateway GPRS support node (GGSN) 534. The SGSN 532 is at the same hierarchical level as the MSC 508 in the GSM network. The SGSN controls the connection between the GPRS network and the MS 502. The SGSN also keeps track of individual MS's locations and security functions and access controls.

A Cell Broadcast Center (CBC) 533 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 534 provides a gateway between the GPRS network and a public packet network (PDN) or other IP networks 536. That is, the GGSN provides interconnecting functionality with external networks, and sets up a logical link to the MS through the SGSN. When packet-switched data leaves the GPRS network, it is transferred to an external TCP-IP network 536, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 538 was introduced with 3GPP Release 5, and includes an IP multimedia subsystem (IMS) 540 to provide rich multimedia services to end users. A representative set of the network entities within the IMS 540 are a call/session control function (CSCF), a media gateway control function (MGCF) 546, a media gateway (MGW) 548, and a master subscriber database, called a home subscriber server (HSS) 550. The HSS 550 may be common to the GSM network 501, the GPRS network 530 as well as the IP multimedia network 538.

The IP multimedia system 540 is built around the call/session control function, of which there are three types: an interrogating CSCF (I-CSCF) 543, a proxy CSCF (P-CSCF) 542, and a serving CSCF (S-CSCF) 544. The P-CSCF 542 is the MS's first point of contact with the IMS 540. The P-CSCF 542 forwards session initiation protocol (SIP) messages received from the MS to an SIP server in a home network (and vice versa) of the MS. The P-CSCF 542 may also modify an outgoing request according to a set of rules defined by the network operator (for example, address analysis and potential modification).

The I-CSCF 543 forms an entrance to a home network and hides the inner topology of the home network from other networks and provides flexibility for selecting an S-CSCF. The I-CSCF 543 may contact a subscriber location function (SLF) 545 to determine which HSS 550 to use for the particular subscriber, if multiple HSS's 550 are present. The S-CSCF 544 performs the session control services for the MS 502. This includes routing originating sessions to external networks and routing terminating sessions to visited networks. The S-CSCF 544 also decides whether an application server (AS) 552 is required to receive information on an incoming SIP session request to ensure appropriate service handling. This decision is based on information received from the HSS 550 (or other sources, such as an application server 552). The AS 552 also communicates to a location server 556 (e.g., a Gateway Mobile Location Center (GMLC)) that provides a position (e.g., latitude/longitude coordinates) of the MS 502.

The HSS 550 contains a subscriber profile and keeps track of which core network node is currently handling the subscriber. It also supports subscriber authentication and authorization functions (AAA). In networks with more than one HSS 550, a subscriber location function provides information on the HSS 550 that contains the profile of a given subscriber.

The MGCF 546 provides interworking functionality between SIP session control signaling from the IMS 540 and ISUP/BICC call control signaling from the external GSTN networks (not shown). It also controls the media gateway (MGW) 548 that provides user-plane interworking functionality (e.g., converting between AMR- and PCM-coded voice). The MGW 548 also communicates with other IP multimedia networks 554.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While the present invention has been described in connection with the preferred embodiments of the various Figures, it is to be understood that other similar embodiments may be used or modifications and additions may be made to the described embodiment for performing the same function of the present invention without deviating therefrom. For example, one skilled in the art will recognize that the present invention as described in the present application may apply to any number of devices connected via a communications network and interacting across the network. Therefore, the present invention should not be limited to any single embodiment, but rather should be construed in breadth and scope in accordance with the appended claims.

What is claimed:
1. A method comprising:
    detecting, on a network, a text communication from a sender mobile device intended for a recipient mobile device associated with a first party before transmitting said text communication to said recipient mobile device;

consulting a second party rule to determine that said text communication is subject to approval by a second party, wherein said second party rule is established by said second party;

responsive to determining that said text communication is subject to approval:
   transmitting a notification that said text communication is subject to approval to said sender mobile device, and
   transmitting a request to a second mobile device associated with said second party, the request comprising a request to approve a transmission of said text communication to said recipient mobile device;

receiving a response from said second mobile device;
determining that said text communication is approved based on said response; and
transmitting said text communication to said recipient mobile device.

2. The method of claim 1 wherein said first party is a child and said second party is a parent.

3. The method of claim 1 further comprising determining, based on said second party rule, that said text communication is at least one of prohibited, permitted, to be copied to said second mobile device, and subject to approval.

4. The method of claim 1 further comprising determining that said response from said second mobile device is received within a predetermined amount of time.

5. The method of claim 1 further comprising generating a copy of said text communication for transmission to said second mobile device.

6. The method of claim 1, wherein said second party rule comprises a list of telephone numbers.

7. The method of claim 1, further comprising transmitting a notification that said text communication is approved to said sender mobile device.

8. The method of claim 1, wherein said second party rule comprises at least one communication type.

9. The method of claim 1, wherein said second party rule comprises at least one notification type.

10. The method of claim 1, further comprising creating a record of said communication.

11. The method of claim 1, wherein the request further comprises caller identification information.

12. The method of claim 1, wherein the request further comprises address book information from said recipient mobile device.

13. The method of claim 1, wherein the request further comprises a voice or name recording.

14. The method of claim 1, wherein the request is in the form of an Instant Message (IM).

15. The method of claim 1, wherein the request is in the form of a script that allows said second party to respond with a yes or a no.

16. The method of claim 1, wherein the request is in the form of a text message.

17. The method of claim 1, wherein said second party rule is established by said second party via a website maintained by a network provider.

18. The method of claim 17, wherein said website provides summary information pertaining to a second communication made to or from said recipient mobile device.

19. The method of claim 17, wherein said website provides a recording of a call made to or from said recipient mobile device.

20. The method of claim 1, wherein said second party rule makes said communication subject to approval during a specified time of day.

21. The method of claim 1, wherein said second party rule makes said communication subject to approval during a specified day of the week.

22. The method of claim 1, wherein said second party rule makes said communication subject to approval if it is to or from an identified third party.

23. The method of claim 1, wherein said second party rule makes said communication subject to approval if it is subject to additional network charges.

24. The method of claim 1, wherein said second party rule makes said communication subject to approval if it is of an identified communication type.

25. The method of claim 1, further comprising:
   detecting a second communication on the network intended for the recipient mobile device;
   consulting the second party rule to determine that said second communication is not subject to approval; and
   sending a notification of said second communication to said second mobile device.

26. The method of claim 1, further comprising sending a periodic summary of communications to or from said recipient mobile device to said second mobile device.

27. A method comprising:
   detecting, on a network, a text communication from a sender mobile device intended for a recipient mobile device associated with a first party before transmitting said text communication to said recipient mobile device;
   consulting a second party rule to determine that said text communication is subject to approval by a second party, wherein said second party rule is established by said second party;
   responsive to determining that said text communication is subject to approval:
      transmitting a notification that said text communication is subject to approval to said sender mobile device, and
      transmitting a request to a second mobile device associated with said second party, the request comprising a request to approve a transmission of said text communication to recipient mobile device;
   receiving a response from said second mobile device;
   determining that said text communication is not approved based on the response; and
   terminating said text communication.

28. The method of claim 27 wherein said first party is a child and said second party is a parent.

29. The method of claim 27 further comprising determining that said response from said second mobile device is received within a predetermined amount of time.

30. The method of claim 27 further comprising generating a copy of said text communication for transmission to said second mobile device.

31. The method of claim 27 wherein further comprising determining, based on said second party rule, that said text communication is at least one of prohibited, permitted, to be copied to said second mobile device, and subject to approval.

32. The method of claim 27, wherein said second party rule comprises at least one communication type.

33. The method of claim 27, wherein said second party rule comprises a list of telephone numbers.

34. The method of claim 27, further comprising transmitting a notification that said text communication is not approved to said sender mobile device.

35. The method of claim 27, further comprising creating a record of said text communication.

36. The method of claim 27, wherein the request further comprises caller identification information.

37. The method of claim 27, wherein the request further comprises address book information from said recipient mobile device.

38. The method of claim 27, wherein the request further comprises a voice or name recording.

39. The method of claim 27, wherein the request is in the form of an Instant Message (IM).

40. The method of claim 27, wherein the request is in the form of a script that allows said second party to respond with a yes or a no.

41. The method of claim 27, wherein the request further is in the form of a text message.

* * * * *